Aug. 4, 1964

R. H. PETERSON 3,143,712

ELECTRONIC MUSICAL INSTRUMENT INCLUDING CASCADED TRANSISTOR OSCILLATORS

Filed June 4, 1959

3 Sheets-Sheet 1

INVENTOR.

RICHARD H. PETERSON

BY Donald H. Sweet

ATTY.

INVENTOR.
RICHARD H. PETERSON
BY
[signature]
ATTY.

Aug. 4, 1964 R. H. PETERSON 3,143,712

ELECTRONIC MUSICAL INSTRUMENT INCLUDING CASCADED TRANSISTOR OSCILLATORS

Filed June 4, 1959 3 Sheets-Sheet 3

INVENTOR.
RICHARD H. PETERSON
BY
Donald H. Sweet
ATTY.

United States Patent Office 3,143,712
Patented Aug. 4, 1964

3,143,712

ELECTRONIC MUSICAL INSTRUMENT INCLUDING CASCADED TRANSISTOR OSCILLATORS

Richard H. Peterson, 10108 Harnew Road E., Oaklawn, Ill.

Filed June 4, 1959, Ser. No. 818,056
2 Claims. (Cl. 331—52)

This invention relates to musical instruments and includes among its objects and advantages (1) a new and improved electronic organ tone generating system employing continuously oscillating transistor oscillators, (2) new and improved electronic key switching means for duplicating certain desired attack and decay characteristics such as those of conventional organ pipes as well as producing percussion effects when desired. In addition, the invention makes possible a considerable simplification in the switching apparatus required for a complete organ that includes octave coupling and the like. Further objects and advantages of the invention will become apparent subsequently.

Figure 1:
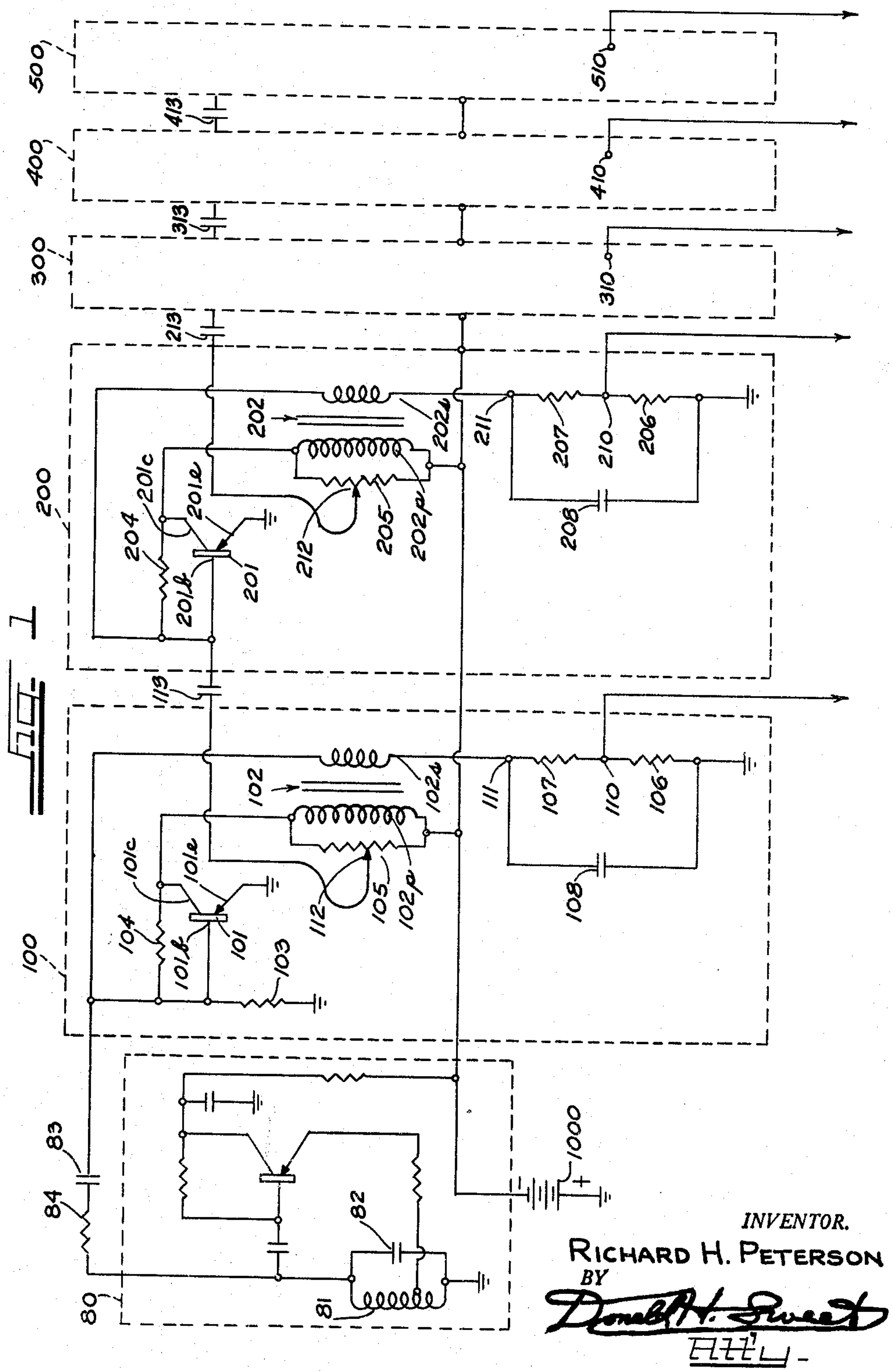
FIGURE 1 is a circuit diagram of five transistor oscillators of the controlled variety and a transistor master oscillator.

In the embodiment selected to illustrate the invention and referring first to FIGURE 1, I have indicated a portion of an all-transistor tone generating system of the cascade oscillator type, comprising the portion that produces the note C.

It is convenient to subdivide the entirety indicated in FIGURE 1 into the tone generator, comprising the master oscillator (80) and five controlled oscillators 100, 200, 300, 400 and 500. It is to be understood that a complete organ would include twelve such cascades, one for each semi-tone of the musical scale.

The master oscillator is ararnged to generate a frequency that corresponds to the frequency of the highest note of the cascade. The first controlled oscillator 100 is connected to the master oscillator and is arranged to oscillate at half the frequency of the master oscillator. The next controlled oscillator 200 produces a signal at half the frequency of oscillator 100, and so on through oscillators 300, 400 and 500, covering a total range of 6 musical octaves.

The frequency of the master oscillator is highly stable and is independent of changes in power line voltages, transistor characteristics, and the like. Its frequency is determined primarily by the constants of the tuned circuit consisting of inductor 81 and capacitor 82. The details of a suitable oscillator are more fully described in any copending application Serial No. 598,582, filed July 18, 1956.

Signal from the master oscillator 80 is coupled to the first controlled oscillator 100 through a coupling circuit including resistor 84 and capacitor 83. The components constituting the oscillator 100 are enclosed in a dotted rectangle for convenience and for clear illustration. In oscillator 100 I have indicated a conventional PNP germanium transistor 101 having a base **101*b*, and emitter 101*e*, and a collector 101*c*. Power for all of the oscillators is supplied by a power source which, for purposes of convenience, has been indicated as a battery at 1000**. This power supply produces a voltage in the order of 12 volts D.C.

The positive terminal of this power source is connected to the common ground, and the negative terminal is connected to one terminal of the primary winding **102*p* of a transformer 102, having a secondary winding 102*s*. The other primary winding termnial is connected to the collector 101*c* of the transistor 101. One terminal of the secondary winding 102*s* connects to the base 101*b* of transistor 101 and the other terminal connects to ground through a network consisting of timing capacitor 108 and output and timing resistors 106 and 107 respectively. This oscillation transformer 102 may be a small, iron core transformer having an impedance ratio of about four to one, the primary winding 102*p*** being the higher impedance winding of the two. The circuit will oscillate with transformers having a wide variety of ratios. However, I have found that a four to one ratio appears to give the highest output consistent with a good saw-tooth wave form, which is highly desirable for musical purposes, and also this helps achieve an unusual degree of stability, as hereinafter set forth.

For the circuit to operate, it is necessary that the secondary winding **102*s* be phased with respect to the primary winding 102*p* in such a manner that changes in collector current through the primary winding cause changes in the current in the secondary winding of such polarity as to further increase the collector current. Under these conditions oscillation is built up as follows. Assume an initial current increase in the primary winding when the power source 1000 to first connected into the circuit. This increasing collector current causes a current in the secondary of the transformer, which, applied to the base of the transistor 101, causes a further increase in collector current and so on until some form of saturation is reached. As soon as the rate of increase of the collector current begins to decrease a current of opposite polarity will be generated in the secondary winding, which in turn causes the base electrode to try to accelerate the decrease in collector current. However, the rate of decrease is limited by the time constants of the timing circuit consisting of capacitor 108 and resistors 106 and 107. Finally the current will approach cutoff and as the rate of change of the primary current finally begins to decrease, the direction of the secondary current is again reversed and the cycle repeats. In this way sustained oscillations are built up at a frequency determined primarily by the aforementioned timing elements but also by certain of the transistor characteristics, including its curent amplification factor, Beta, and by the internal conducting and leakage resistance characteristics of the transistor. Such an oscillator is dependable and relatively inexpensive but is quite unstable, the exact frequency of oscillation depending upon the power supply voltage, and on temperature because the transistor characteristics tend to vary to a considerable extent with changes in temperature. It is a characteristic of this type of oscillator, that it can be easily synchronized by the introduction of a relatively small amount of energy from the master oscillator 80**.

To get the first controlled oscillator 100 to "lock in" at half the frequency of the master oscillator requires only a suitable value for capacitor 108 and resistors 106 and 107. In practice, resistor 107 might be made variable of resistor 107 or capacitor 108 might be selected to set the frequency of oscillator 100 within a suitable range. Since the frequency of oscillation of controlled oscillators is also dependent upon the amount of synchronizing signal applied to them, it is also possible to obtain the necessary adjustment by means of selecting or otherwise adjusting the value of either resistor 84 or capacitor 83.

Figure 3:
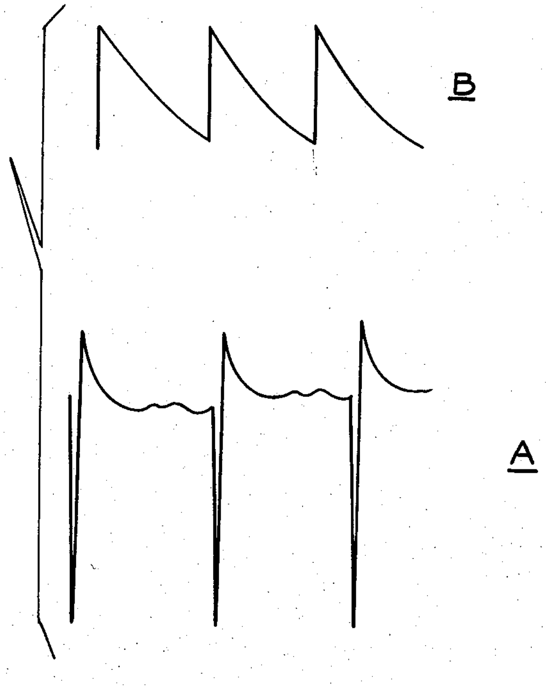
FIGURE 3 shows two wave forms that are produced by the circuit.

Resistor 106 is ordinarily relatively small compared to the resistance of resistor 107 in order that an output terminal 110 can be provided from which output signal can be drawn without affecting adversely the adjustment of the oscillator 100. Under some conditions output can be taken from the point 111 but if this is done care must be exercised to see that the resistance of the external "load" circuit is high enough to prevent the timing of oscillator 100 from being affected to a degree that will cause the oscillator to go out of synchronism or to be synchronized at other than the desired frequency. A further advantage of taking the output signal from the tap 110 is that the wave form at this point is not changed appreciably regardless of the impedance of the load circuit. The wave form at this point is shown at B in FIGURE 3.

Resistor 105, connected across the primary of the transformer 102, limits the peak voltage of the inductive surge developed in the transformer to a safe value so as to prevent damage to the transistor. This resistor 105 is also provided with a sliding tap 112 that is connected to the synchronizing capacitor 113 that couples energy into the next lower "controlled" oscillator 200.

The oscillator 200 is substantially identical with the first controlled oscillator 100 except that its timing resistors and/or its timing capacitor are selected so that this oscillator will have a free-running frequency somewhat below an octave below the frequency of the first controlled oscillator 100. Now by adjusting the potentiometer 105 it is possible to vary the amount of synchronizing current applied to the base circuit of oscillator 200 and this affords a very desirable and highly efficient method of adjusting oscillator 200 to lock in at the exact ratio of 2 to 1 with respect to the first controlled oscillator.

This type of synchronization also avoids the problem of contamination of the signals of oscillator 100 by leakage into oscillator 100 of the lower frequency produced by oscillator 200. This feed-back is avoided because the impedance of the circuit between the tap on the potentiometer 105 and ground through the power supply 1000 is very low compared with the impedance of the coupling capacitor 113 at the operating frequency. However, the impedance of the base circuit of transistor 201 is relatively high compared with the impedance of coupling capacitor 113 and so it is possible to pass energy into the lower frequency oscillator and at the same time pass very little energy in the opposite direction. An oscilloscope shows that the wave form of the signal that appears across resistor 105 is a pulse, as is shown at A in FIGURE 3. This type of wave form is of rather limited usefulness musically because the fundamental frequency is undesirably weak compared to the high order harmonics. This wave form is highly desirable for synchronizing purposes since it causes the triggering of the next lower oscillator at the exact time that this pulse occurs and the result in an exact phase relationship between the octavely related oscillators. This is extremely desirable for reasons that are set forth in the U.S. Patent to Kock, 2,233,948, issued March 4, 1941.

Referring again to oscillator 100, resistor 104 connected between the collector 101*c* and the base 101*b* of transistor 101, and resistor 103 connected between the base and the emitter 101*e* of transistor 101, are for the purpose of stabilizing the oscillator with respect to changes in temperature. In ordinary transistor amplifier circuits of the common emitter variety it is common to have such resistors in order to establish the operating point of the transistor. In an oscillator of this type, however, there is no definite operating point in the usual sense, because the transistor currents vary between the extremes determined by what might be thought of as the saturation and cutoff characteristic of the transistor. Therefore, I do not look upon these resistors as merely setting an operating point. In addition, resistors 103 and 104 are connected in parallel with the leakage resistances of the transistor and, therefore, minimize the harmful effects of the changes in the leakage of the transistor that take place with changes in temperature. I have found that with the values shown in the accompanying chart, a remarkable degree of temperature stability is obtained.

Transistors have not yet appeared in organs using any of the many known forms of locked oscillators. It is believed that the reason for this is primarily due to the instability of transistor circuits unless very high quality transistors are used or unless extensive and expensive precautions are observed, including the use of temperature-sensitive compensating elements and the like. In the circuit of this invention exceptional voltage stability as well as temperature stability is obtained.

Most locked oscillator systems, whether employing vacuum tubes or transistor circuitry, are relatively sensitive to changes in operating voltages. Since the free-running frequency of this type of oscillator, as well as most other types of synchronizable oscillators, is highly dependent on voltage, it is easy to see that changes in voltage can easily cause the oscillator to lock in at an improper ratio since the oscillator will generally tend to lock in at the sub-multiple of the controlling oscillator's frequency nearest the free-running frequency of the controlled oscillator. Thus, if the supply voltage changes by, say 30% in the direction that causes the frequency of oscillation to decrease, the controlled oscillator will generally go into divisions by 3, and not the desired division by 2.

With the circuit of this invention, the complete cascade is capable of operating over an exceptionally wide range of voltages extending from, for example, two volts to beyond 40 volts or until the transistors break down. This unusual stability results from the compensating nature of the changes that take place in the frequency of the controlled oscillators due to two things that happen when the voltage is changed.

First: Oscillators according to the invention and using components of the values specified in the chart below have the characteristic that their frequency decreases with increasing voltage at a relatively uniform rate over a wide range of voltages. Since the frequency of the master oscillator is not affected by changes in voltage it is apparent that if we were to increase the voltage of the source 1000, above the normal operating potential, we would expect the free-running frequency of oscillator 100 to decrease until it would divide by 3 instead of by 2.

But second: The output amplitude of the signal produced by each oscillator is substantially directly proportional to the voltage of the power source 1000, and raising the voltage proportionately increases the output amplitude of the synchronizing signal fed into the next lower controlled stage. The effect of this increased synchronizing signal may be selected to almost exactly compensate for the normal change in the free-running frequency of oscillation and the result is division by 2 over the complete range of voltages specified.

Since the master oscillator produces a relatively pure sine wave rather than a pulse wave it is a little more difficult to reliably synchronize the first divider to the master, than it is to synchronize the controlled oscillators, one to another. For this reason, I have found it desirable to maintain the inherent temperature stability of the controlled oscillator 100 to a higher degree than is the case with the other controlled oscillators. For this reason, the resistor 103 appears in the oscillator circuit of oscillator 100, but not in the other controlled oscillators, where the stability is entirely sufficient without this component.

Figure 2:
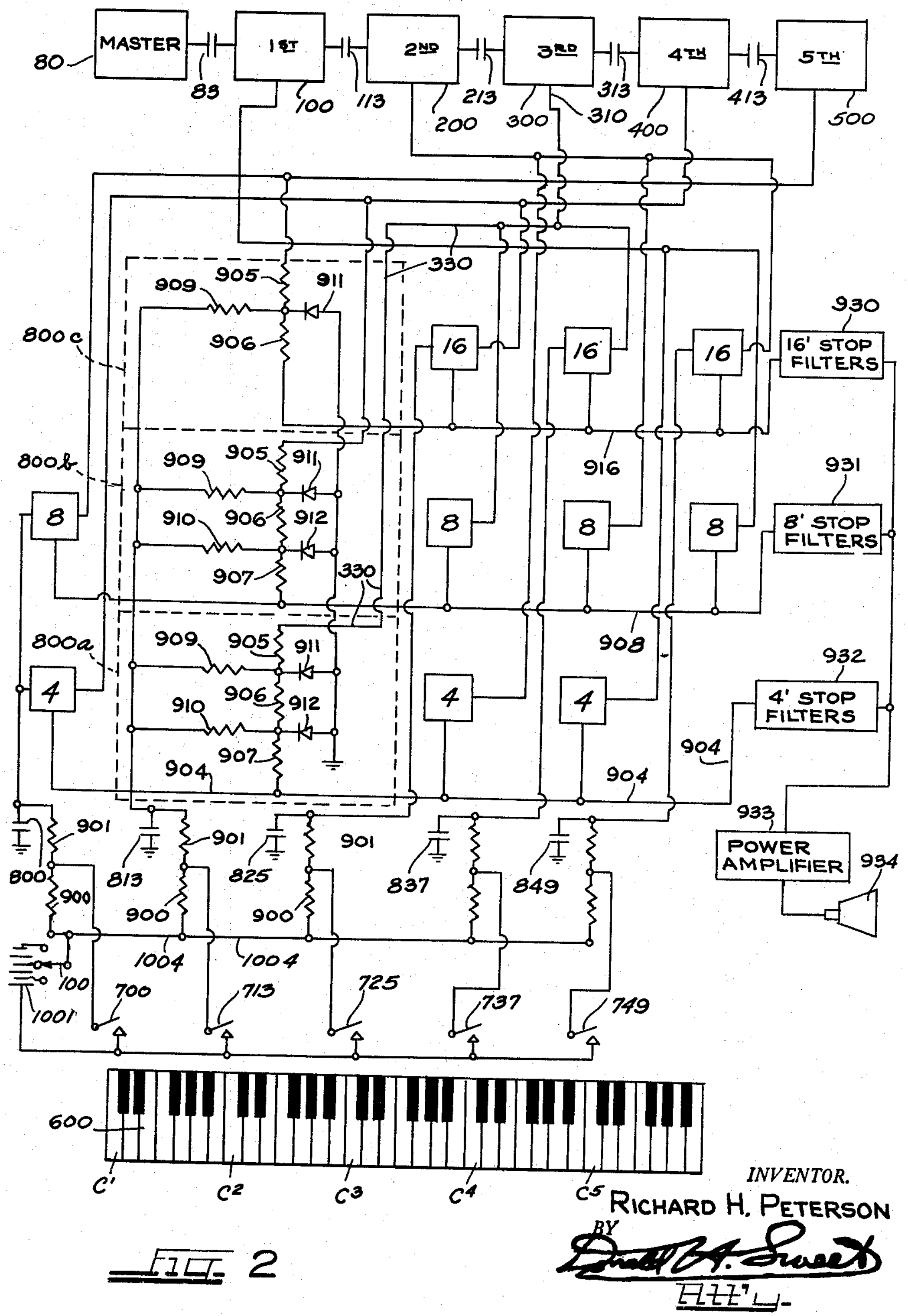
FIGURE 2 is a wiring diagram of the electronic key switching means and also shows the relationship between the tone generator, the electronic key switching means, the keyboard and the amplification system of an organ according to the invention.

Referring now to FIGURE 2, I have indicated the cascade of tone generators of FIGURE 1 by the rectangles 80, 100, 200, 300, 400, 500. A keyboard is shown at 600, which may be the only keyboard of a small organ, or one of several keyboards of a larger instrument. Associated with each key of this keyboard is a key switch such as that illustrated at 700. Other key switches are shown at 713, 725, 737, 749. It will be understood that actually there will be a keyswitch for each and every key of the keyboard, but for purposes of simplification I have only illustrated the switches associated with the five C keys of the keyboard shown. Associated with each key switch is one or more electronic keying circuits, or keying networks, some of which are identified 800. Again, for purposes of simplification, most of these circuits are shown as rectangles, but the keying circuits associated with key C2 and switch 713 are shown schematically. Each of the keying networks 800*a*, 800*b*, and 800*c* functions as an electronic key switch. Ordinary key switches are commonly employed for directly switching the signal frequencies from the various oscillators into the amplification circuits. However, with such direct switching it is impossible to avoid keying thumps, clicks, and other transient sounds that are very unmusical and very much unlike the way organ pipes and acoustic instruments begin and terminate their speech. Therefore, I have provided keying networks that act in response to currents controlled by ordinary key switches to cause the more or less gradual beginning of the sound and the more or less gradual decay of the same in such a way that when the values of the components are properly proportioned, very natural and highly musical speech characteristics are obtained.

In order to obtain the sounding of several octavely related notes from a single key, as is the customary practice in organs, it is usually necessary to provide separate switches or switching networks, all operated from a single key. Using ordinary organ terminology, bus bars are provided for collecting tones of 16 foot pitch, 8 foot pitch, and 4 foot pitch. The 8 foot stop produces a tone having the same fundamental frequency as the nominal frequency of the key depressed. The 16 foot stop delivers a note an octave lower, and the 4 foot stop delivers a note an octave higher. These bus bars are illustrated at 916, 908, and 904.

Each tone collecting bus bar is connected to suitable stop filters, the output of which in turn are connected to the power amplification and translating system. These functions are performed by the equipment identified as 930, 931, 932, 933 and 934. For further details on the type of stop filters that are suitable for this type of organ, reference is made to the patent issued to Winston Kock, U.S. Patent 2,233,948, issued March 4, 1941. The keying networks 800 are, in effect, electronic key switches that connect the various oscillators to their appropriate bus bars upon the depression of a playing key. Network 800*a* serves to connect the output signal from oscillator 300 into the 4 foot bus bar 904 in response to the closing of key switch 713 by playing key $C_2$.

When playing key $C_2$ is depressed, the path of the signal current is from the output terminal 310 of oscillator 300, through conductor 330 through resistors 905, 906 and 907, to bus bar 904. When key $C_2$ is released, switch 713 is opened and the signal in the keying network is shunted to ground through the diodes 911 and 912. These diodes, under key-up conditions, represent very low impedances to the tone signals because they are now biased to be highly conductive. The bias for these diodes is obtained from the keying power source 1001 through switch 1003, conductor 1004, keying resistors 900 and 901 and thence to the diodes 911 and 912 through resistors 909 and 910. These diodes are preferably semiconductor devices and may be of the well-known germanium variety or may be any other form of diode, there being many types well-known in the art. It is well-known that the impedance of a diode is highly determined by the magnitude and the polarity of the voltage applied across its terminals. Thus with the key switch 713 open, the diodes 911 and 912 are biased to be very good conductors and short out the signal associated with the keying network 800*a* and allow, for practical purposes, no signal to reach bus bar 904. Upon depressing key $C_2$, key switch 713 is closed, and any bias on the diodes is shorted to ground through resistors 909 and 910 in series with resistor 901. Resistors 909 and 910 have a relatively high value compared to the resistance of resistors 905, 906 and 907, and, therefore, have practically no effect on the conduction of signal through the network.

Capacitor 813, together with resistors 901 and 900, determines the rate of the attack and decay of the tones by controlling the rate of application and diminution of the voltage applied to the diodes. Thus when key 713, is opened, capacitor 813 must charge through resistors 900 and 901 before the voltage buildup on diodes 911 and 912 is complete. It is apparent, therefore, that the total resistance of these two resistors in combination with the capacitance of capacitor 813 determine the decay characteristics of the tone. In a similar manner, when switch 713 is closed, capacitor 813 must be discharged through resistor 901 and the different time constant provided by these two parts determines the attack characteristic. The attack and the decay characteristics are also influenced by the potential of the power source 1001 and by modifying the potential from this source, I am able to produce a variety of percussion effects. Switch 1003 is arranged to select any of a plurality of power supply potentials. By selecting a relatively high potential the voltage across diodes 911 and 912 can be brought to a point sufficient to cut off the transmission of signal through the keying network 800*a* very quickly to produce, for example, the decay associated with an ordinary organ pipe. If we move switch 1003 to a lower voltage tap on the power source 1001 it will take longer for the capacitor 813 to reach the cut-off level and the decay characteristic will simulate the decay of percussion instruments such as struck bells or struck or plucked strings. Several different decay times can easily be provided by changing the voltage in appropriate steps.

The continuous oscillation of each oscillator involves pulses that generate, in the circuit comprising resistors 106 and 107 and their shunt capacitor 108, (see FIGURE 1) a D.C. potential in the direction of high resistance for diodes 911 and 912. This self-bias prevents clipping and distortion of the signal during key-down conditions.

Referring now to keying networks 800*b* and 800*c*, these keying networks are identical in nature with keying network 800*a* just described, with one exception. Keying network 800*b*, switches the signal from oscillator 400 into bus bar 908 and keying network 800*c* switches signal from oscillator 500 into bus bar 916. It is to be noted that these three separate switching functions have all been performed with but a single mechanical key switch 713 and with a single capacitor 813 and with resistors 900 and 901 together with capacitor 813 governing the attack and decay characteristics of all three switching operations. This results in a great simplification of the wiring in a complete instrument and substantially reduces the cost of an organ according to the invention.

The exception mentioned in the preceding paragraph is that the electronic keying unit 800*c* for key $C_2$ duplicates only the resistors 905 and 906, and the shunting circuit comprising resistor 909 and diode 911. The second attenuation circuit, including resistor 910, diode 912 and resistor 907, has been simply omitted.

About the lowest octave or so of the standard frequency range for instruments of this type, is low enough in pitch so that adequate reduction at a suitable rate, down to practical inaudibility, can be obtained with a single attenuation circuit.

Throughout the rest of the frequency range, the two cascaded shunting circuits give reductions equal to the product of the reduction ratio of the first attenuation circuit, multiplied by the reduction ratio of the second attenuation circuit.

Electronic attenuators for the same purposes as those disclosed herein, have been repeatedly proposed in the past, but I have no knowledge of any that are not open to serious objection due to one or more of the following defects:

The first defect is noticeable distortion of tone quality during the transition periods of attack and decay.

The second defect is the delivery of signal when no signal is desired, either by reason of insufficient attenuation, or by leakage, usually through shunt capacitance.

The third defect is current surges at frequencies below musical frequencies, sometimes called thumps. Where a single diode must do all the attenuation, heavy currents are needed, and the thump tends to become objectionable. The use of two diodes, as herein disclosed, accomplishes a great reduction in the required D.C. current. In addition, any thump originating in the first stage is attenuated in the second stage.

To avoid the first problem, it has been proposed to use a substantially square signal wave, because truncating such a wave during the decay period will not drastically alter the harmonic components of the wave. But the production of such a wave introduces difficulties involving the type of generator and transmission, that are more serious than the other problems which are more or less reduced or eliminated by the use of a square wave shape.

It has also been proposed to start with the desirable sawtooth wave shape during sustained tone conditions, and pass the signal through a series diode through which the signal must pass at all times, including attack, sustained tone and decay periods. This also introduces more problems than it solves.

Such a diode carrying the utilized portion of signal has enough direct leakage and capacitance to transmit appreciable signal at times when no sound at all is desired. Worse, during decay it amputates all but the tip of each wave, and the delivered remainder becomes a series of abrupt, widely spaced pulses. Direct amplification of this remainder generates a buzz that is unmusical. Sufficient capacitance in the circuitry receiving the isolated pulse wave can soften this buzz into a reed tone that is not seriously incongruous, if the sustained tone was also of a reed quality. But to have a flute note turn into a reed note during its decay period would render the instrument as a whole highly unsatisfactory.

Applicant's shunt diode connections 911 and 912 never carry any signal that goes on into the amplifiers. More, during decay they amputate the top of the wave and all the rest of the wave goes on into the amplifying means. To the musical ear, the change in quality is relatively insignificant, and what little change there is consists in relatively slow reduction of the lower frequency components, with some alteration and concomitant reduction of the higher overtones. It is a fortunate coincidence that these particular attack and decay phenomena are closely similar to what actually takes place during the attack and decay of the corresponding acoustic musical instrument.

The attenuators herein disclosed have been employed with equally satisfactory results, not only with the sawtooth wave forms delivered to them according to the above disclosure, but with sine curve and other wave shapes.

It is believed the values of the significant elements involved can be easily selected or determined by anyone skilled in the art. However, the following chart gives one typical set of values for good results.

CHART OF TYPICAL COMPONENT VALUES

*Oscillator Values*

| | |
|---|---|
| Resistor **103** | 4700 ohms. |
| Resistor **104** | 100,000 ohms. |
| Resistor **105** | 500 ohms. |
| Resistor **106** | 2000 ohms. |
| Resistor **107** | 16,000 ohms. |
| Capacitor **108** | .05 mfd. to 1 mfd. depending on frequency. |
| Transistor **101** | R.C.A.—2N109. |
| Capacitor **113** | .002 mfd. |

*Keying Circuit Values*

| | |
|---|---|
| Resistor **905** | 68,000 ohms. |
| Resistor **906** | 68,000 ohms. |
| Resistor **907** | 68,000 ohms. |
| Resistor **909** | 100,000 ohms. |
| Resistor **910** | 220,000 ohms. |
| Diodes **911** and **912** | Amperex 1N87. |
| Capacitor **813** | 15 mfd. |
| Resistor **901** | 1000 ohms. |
| Resistor **900** | 47,000 ohms. |

It will be noted that resistor 910 has approximately twice the resistance value of resistor 909. With the germanium diodes specified, the values in the chart give an optimum shape for the time function curve of the decay of the tone.

Each of the shunt circuits 909, 911 and 910, 912, will have a characteristic time function, which will vary with the diode characteristics and the value of the resistor 909 or 910.

A highly trained ear distinguishes and attaches material aesthetic values to different time functions during the critical and distinctive tone decay period. The time curve of each attenuation circuit approximates a logarithmic decrement curve, and in the cascade arrangement disclosed the first such curve is subsequently modified by the superposed curve of the second circuit, to give at all times an attenuation ratio which is the product of the instantaneous attenuation ratios of the two circuits. With resistors 909 and 910 of the same value, the combined effect is merely to shorten the time scale, but when one logarithmic decrement curve is materially longer in time than the other, aesthetically desirable variations result.

With other diodes, or with non-polar voltage-sensitive components of the type commonly called varisters, materially different resistor values will give the best aesthetic results.

Others may readily adapt the invention for use under various conditions of service, by employing one or more of the novel features disclosed, or equivalents thereof. It will, for instance, be obvious that additional capacitances in parallel with capacitors 800, 813, etc. could provide for changes in decay rate, or, in combination with the power source 1001, shift the range of decay rates available by manipulating the switch 1003. The capacitors 800, 813, etc. can also each be arranged to have different charge and discharge rates by one or more alternate circuits around them, as more fully described in my copending application Serial Number 735,854, filed May 16, 1958. Variations in the values of resistors 900 and 901 also provide for a wide variety of specifically different attack and decay characteristics.

The keying networks 800*a* and 800*c* have been shown all connected to the same attack and decay control, but separate and different controls might be provided for one or more of them.

In an organ with more than one keyboard, intermanual coupling can be of greater variety if one or more of the networks 800*a*, 800*b*, and 800*c* is provided also with its own key switch.

As at present advised with respect to the apparent scope of my invention, I desire to claim the following subject matter:

1. A cascade of transistor oscillators having high temperature and voltage stability comprising, in combination: a first, master oscillator of constant frequency; a second, slave oscillator operating at half the frequency of said master; a third, slave oscillator operating at half the frequency of the second, and so on; each slave oscillator including a transistor having a base, an emitter and a collector; each slave oscillator being a relaxation oscillator and having a feed-back transformer; said transformer having a primary winding in the collector-emitter circuit and a secondary winding in the base-emitter circuit; a low impedance potentiometer having a tap and connected across the primary winding of said transformer; a coupling capacitor, of impedance at the operating frequency much greater than said potentiometer and connected to said potentiometer tap; a connection from said coupling capacitor to the base of the transistor of the next, successor oscillator; the transistor of each slave oscillator having a stabilizing resistor between its collector and its base; said stabilizing resistor having low impedance compared to the leakage resistance of the collector-base junction of its associated transistor.

2. A cascade of transistor oscillators having high temperature and voltage stability comprising, in combination: a first, master oscillator of constant frequency; a second, slave oscillator operating at half the frequency of said master; a third, slave oscillator operating at half the frequency of the second, and so on; each slave oscillator including a transistor having a base, an emitter and a collector; each slave oscillator being a relaxation oscillator and having a feed-back transformer; said transformer having a primary winding in the collector-emitter circuit and a secondary winding in the base-emitter circuit; a low impedance potentiometere having a tap and connected across the primary winding of said transformer; a coupling capacitor, of impedance at the operating frequency much greater than said potentiometer and connected to said potentiometer tap; a connection from said coupling capacitor to the transistor of the next, successor oscillator; the transistor of each slave oscillator having a stabilizing resistor between its collector and its base; said stabilizing resistor having low impedance compared to the leakage resistance of the collector-base junction of its associated transistor.

References Cited in the file of this patent

UNITED STATES PATENTS

| | | |
|---|---|---|
| 2,227,019 | Schlesinger | Dec. 31, 1940 |
| 2,233,258 | Hammond et al. | Feb. 25, 1941 |
| 2,486,208 | Reinstra | Oct. 25, 1949 |
| 2,843,743 | Hamilton | July 15, 1958 |
| 2,916,958 | Hanert | Dec. 15, 1959 |
| 2,919,412 | Tyler | Dec. 29, 1959 |
| 2,924,137 | Peterson | Feb. 9, 1960 |
| 2,957,145 | Bernstein | Oct. 18, 1960 |
| 2,983,877 | Broermann | May 9, 1961 |

UNITED STATES PATENT OFFICE

CERTIFICATE OF CORRECTION

Patent No. 3,143,712 — August 4, 1964

Richard H. Peterson

It is hereby certified that error appears in the above numbered patent requiring correction and that the said Letters Patent should read as corrected below.

Column 1, line 44, for "ararnged" read -- arranged --; line 58, for "any" read -- my --; column 2, line 11, for "termnial" read -- terminal --; line 35, for "to" read -- is --; line 53, for "curent" read -- current --; column 3, line 2, for "of" read -- or --; line 63, for "in" read -- is --; column 10, line 7, for "potentiometere" read -- potentiometer --.

Signed and sealed this 29th day of December 1964.

(SEAL)
Attest:

ERNEST W. SWIDER
Attesting Officer

EDWARD J. BRENNER
Commissioner of Patents